United States Patent
Hamilton et al.

(10) Patent No.: US 7,734,888 B1
(45) Date of Patent: Jun. 8, 2010

(54) CAPACITY GUARANTEES IN A STORAGE SYSTEM

(75) Inventors: Eric C. Hamilton, Durham, NC (US); Peter Griess, San Francisco, CA (US); Robert L. Fair, Cary, NC (US); Himanshu Aggarwal, Cary, NC (US); John K. Edwards, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 377 days.

(21) Appl. No.: 11/101,909

(22) Filed: Apr. 8, 2005

(51) Int. Cl.
*G06F 12/00* (2006.01)

(52) U.S. Cl. .................. 711/170; 711/114; 711/117; 711/171; 711/172; 711/173

(58) Field of Classification Search .......... None
See application file for complete search history.

(56) References Cited

U.S. PATENT DOCUMENTS

| | | | |
|---|---|---|---|
| 5,457,793 | A | 10/1995 | Elko et al. |
| 5,461,712 | A | 10/1995 | Chelstowski et al. |
| 5,560,003 | A | 9/1996 | Nilsen et al. |
| 5,606,689 | A | 2/1997 | Nakagawa |
| 5,634,096 | A * | 5/1997 | Baylor et al. ............ 714/6 |
| 6,862,661 | B2 | 3/2005 | Riedle et al. |
| 6,983,303 | B2 | 1/2006 | Pellegrino at al. |
| 7,028,158 | B1 | 4/2006 | Beatty et al. |
| 7,089,395 | B2 * | 8/2006 | Jacobson et al. ......... 711/202 |
| 7,149,866 | B2 | 12/2006 | Blandy |
| 2002/0056019 | A1 | 5/2002 | Kolodner et al. |
| 2002/0199059 | A1 | 12/2002 | Riedle et al. |
| 2003/0050729 | A1 | 3/2003 | Basham et al. |
| 2003/0126132 | A1 * | 7/2003 | Kavuri et al. ............ 707/10 |
| 2004/0044827 | A1 | 3/2004 | Carlson et al. |
| 2005/0166011 | A1 * | 7/2005 | Burnett et al. ............ 711/112 |

OTHER PUBLICATIONS

Co-Pending U.S. Appl. No. 11/242,805 filed Oct. 3, 2005.
Co-Pending U.S. Appl. No. 11/114,518 filed Apr. 25, 2005.
Notice of Allowance mailed Nov. 30, 2009 in Co-Pending U.S. Appl. No. 11/114,518 filed Apr. 25, 2005.
Final Office Action mailed May 11, 2009 in Co-Pending U.S. Appl. No. 11/114,518 filed Apr. 25, 2005.
Non-Final Office Action mailed Dec. 12, 2008 in Co-Pending U.S. Appl. No. 11/114,518 filed Apr. 25, 2005.
Final Office Action mailed Jun. 18, 2008 in Co-Pending U.S. Appl. No. 11/114,518 filed Apr. 25, 2005.
Non-Final Office Action mailed Dec. 4, 2007 in Co-Pending U.S. Appl. No. 11/114,518 filed Apr. 25, 2005.
Non-Final Office Action mailed Feb. 16, 2007 in Co-Pending U.S. Appl. No. 11/114,518 filed Apr. 25, 2005.
Notice of Allowance mailed Jan. 22, 2009 in Co-Pending U.S. Appl. No. 11/242,805 filed Oct. 3, 2005.
Final Office Action mailed May 28, 2008 in Co-Pending U.S. Appl. No. 11/242,805 filed Oct. 3, 2005.
Non-Final Office Action mailed Jan. 2, 2008 in Co-Pending U.S. Appl. No. 11/242,805 filed Oct. 3, 2005.
David A. Patterson, "A Case for Redundant Arrays of Inexpensive Disks (RAID)", 1998, USC-Berkeley Dept. of Computer Science, p. 109-116.
Ruth Baylis, "Oracle Database Administrator's Guide", Dec. 2003, Oracle Corporation, 10.1 Release, Table 13-5.

* cited by examiner

*Primary Examiner*—Christian P Chace
*Assistant Examiner*—Alan Otto
(74) *Attorney, Agent, or Firm*—Perkins Coie LLP

(57) ABSTRACT

A file system receives a request to set a capacity guarantee for a virtual volume associated with a logical aggregation of physical storage. In response, the file system sets the capacity guarantee to indicate that the logical aggregation of physical storage is to provide a specified amount of space to the virtual volume. The amount of space provided to the virtual volume may be based, at least in part, on a guarantee type. The guarantee type may include, for example, volume, file, none, or partial.

13 Claims, 7 Drawing Sheets

CAPACITY GUARANTEES IN A STORAGE SYSTEM

This application is related to U.S. patent application Ser. No. 11/114,518 titled "Apparatus and Method for Managing of Common Storage in a Storage System," filed on Apr. 25, 2005.

FIELD OF THE INVENTION

At least one embodiment of the present invention pertains to storage systems, and more particularly, to a method and apparatus for capacity guarantees in a storage system.

BACKGROUND

A storage system is a special-purpose processing system used to store and retrieve data on behalf of one or more client processing systems ("clients"). A storage system can be used for many different purposes, such as, to provide multiple users with access to shared data or to backup mission critical data.

A file server is an example of a storage system. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage system is a device which provides clients with block-level access to stored data, rather than file-level access, or a device which provides clients with both file-level access and block-level access.

A volume is a set of disks presented to an operating environment as a range of consecutively numbered logical blocks with disk-like storage and input/output semantics. In conventional storage systems, there is a fixed relationship between a volume and the disks that are associated with the volume. This fixed relationship means that each volume has full control over the disks that are associated with the volume. For example, only the volume associated with the disk can read and/or write to the disk. Unused space within the disks associated with the volume cannot be used by another volume. Thus, even if a volume is only using a fraction of the space on its associated disks, the unused space is reserved for the exclusive use of the volume.

Another feature of the fixed relationship between a volume and its associated disks, in conventional storage systems, is that the size of the volume is substantially determined by the capacity of the associated disks. This means that the size of the underlying physical storage dictates the size of the volume. If a user wants to increase the size of the conventional volume, she must add disks to the physical storage (e.g., add a RAID group).

SUMMARY OF THE INVENTION

Embodiments of the invention are generally directed to a system, for example a file system, that receives a request to set a capacity guarantee for a virtual set of storage associated with a logical aggregation of physical storage. In response, the system sets the capacity guarantee to indicate that the logical aggregation of physical storage is to provide a specified amount of space to the virtual volume. In an embodiment, the amount of space provided to the virtual volume is based, at least in part, on a guarantee type.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus for providing a capacity guarantee in a storage system is described. As described in greater detail below, in certain embodiments of the invention the method includes setting a capacity guarantee for a virtual volume that is associated with a logical aggregation of physical storage. A "virtual volume" refers to a logical container of data that can be sized, resized, managed, and moved independently from the underlying physical storage. The "logical aggregation of physical storage" refers to an entity that provides the connection between one or more virtual volumes and the underlying physical storage. For ease of description, the term "aggregate" is sometimes used when describing the "logical aggregation of physical storage."

Figure 1:
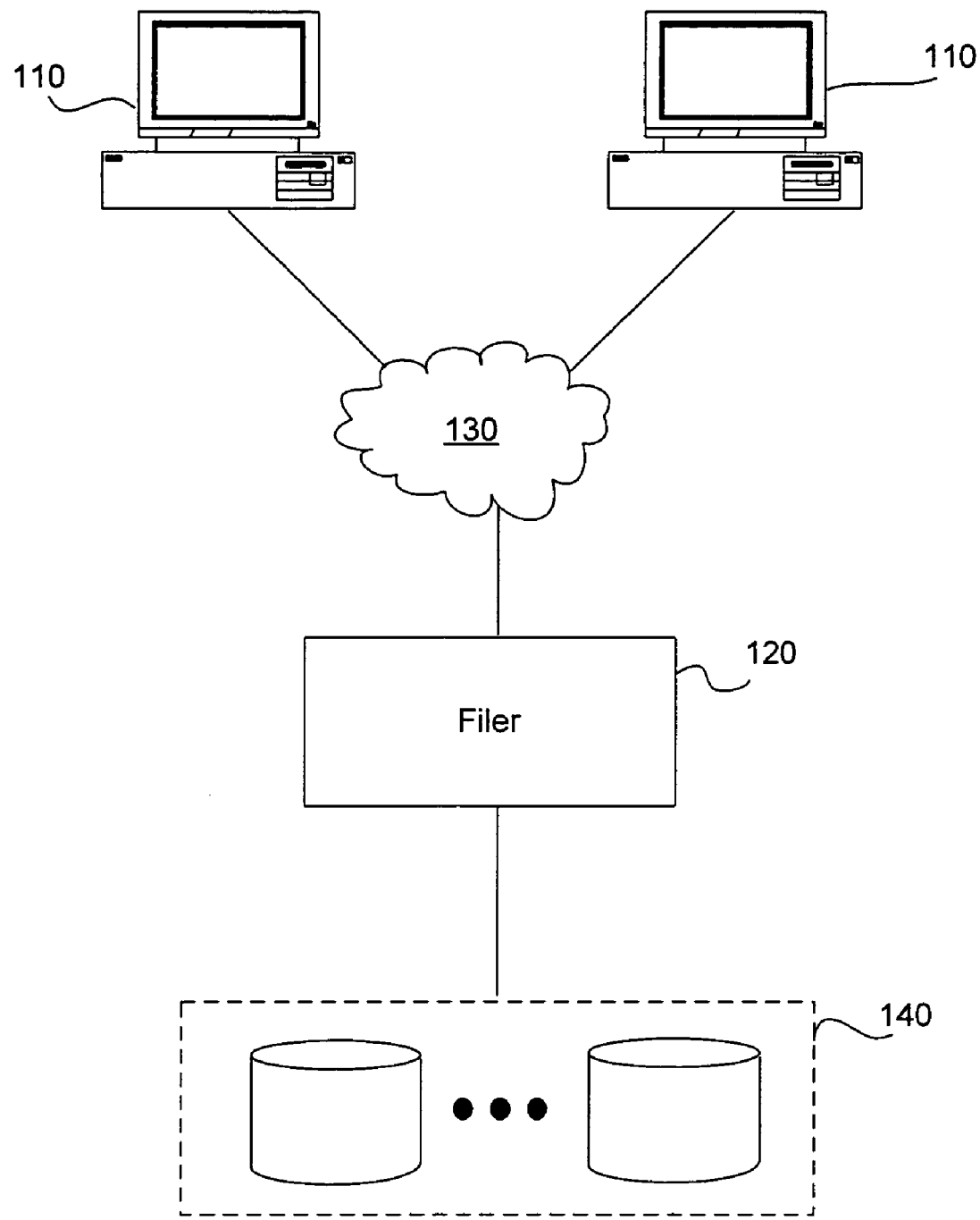
FIG. 1 shows a network environment that includes a storage system which implements the invention.

As noted above, the capacity guarantee technique introduced herein can be implemented in a storage system. FIG. 1 shows a simple example of a network environment which incorporates a storage system 120. Note, however, that the capacity guarantee technique introduced herein is not limited to use in traditional storage systems. For example, the technique can be adapted for use in other types of storage systems, such as storage systems which provide clients with block-level access to stored data or processing systems other than storage systems.

Storage system 120 is coupled locally to a storage subsystem 140 which includes a set of mass storage devices, and to a set of clients 110 through a network 130, such as a local area network (LAN). Each of the clients 110 may be, for example, a conventional personal computer (PC), workstation, or the like. Storage subsystem 140 is managed by storage system 120. For example, storage system 120 receives and responds to various read and write requests from the clients 110, directed to data stored in or to be stored in storage subsystem 140. The mass storage devices in storage subsystem 140 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

Storage system 120 may have a distributed architecture; for example, it may include a separate N- ("network") blade and D- (disk) blade (not shown). In such an embodiment, the N-blade is used to communicate with clients 110, while the D-blade includes the file system functionality and is used to communicate with the storage subsystem 140. Alternatively, storage system 120 may have an integrated architecture, where the network and data components are all contained in a single box. The storage system 120 further may be coupled through a switching fabric to other similar storage systems (not shown) which have their own local storage subsystems. In this way, all of the storage subsystems can form a single storage pool, to which any client of any of the storage systems has access.

Figure 2:
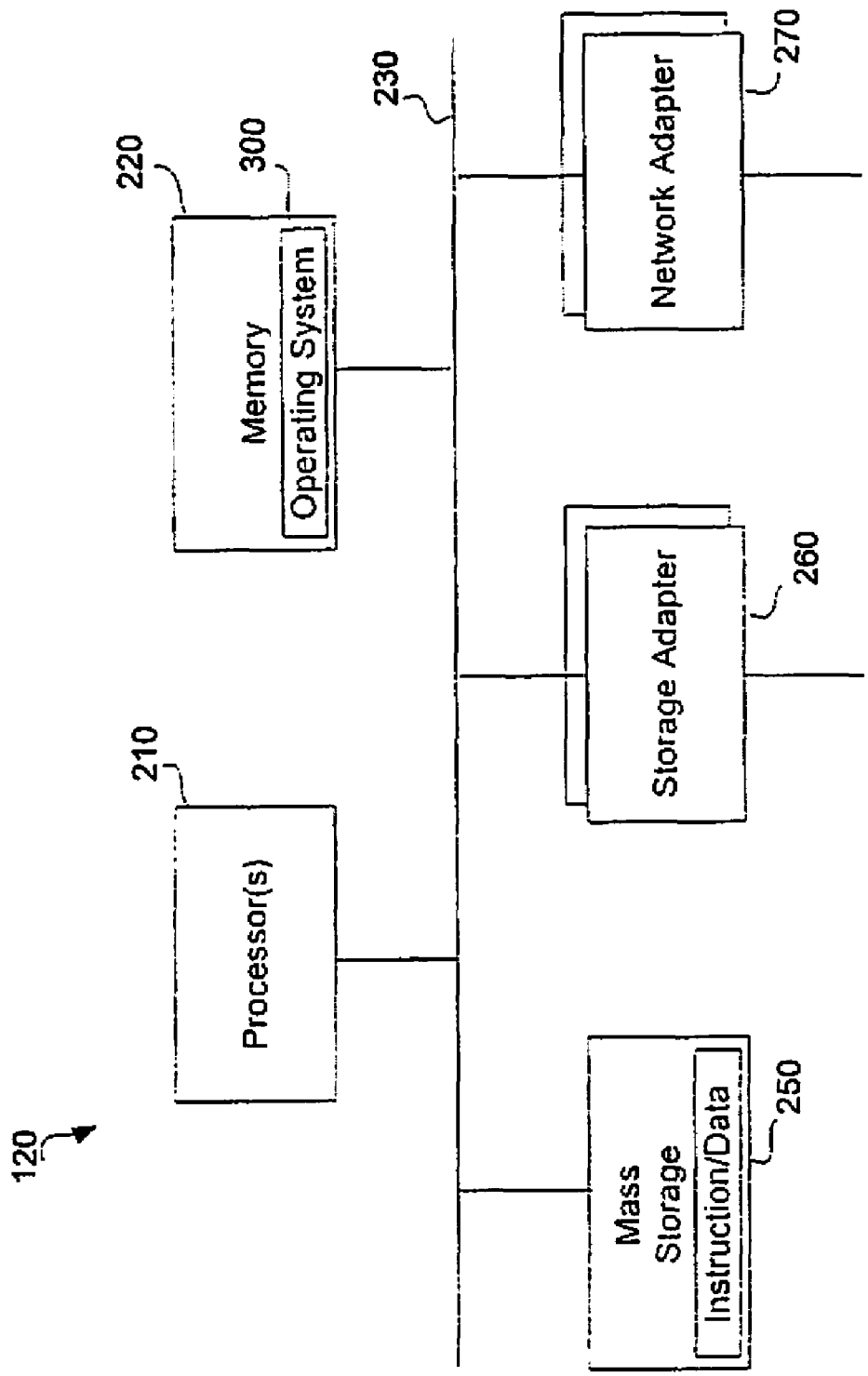
FIG. 2 is a block diagram showing the architecture of a storage system that can implement the invention.

FIG. 2 is a block diagram showing the architecture of storage system 120, according to certain embodiments of the invention. Certain standard and well-known components which are not germane to the present invention are not shown. Storage system 120 includes one or more processors 210 and memory 220 coupled to a system interconnect 230. System interconnect 230 shown in FIG. 2 is an abstraction that represents any one or more separate physical buses and/or point-to-point connections, connected by appropriate bridges, adapters and/or controllers. System interconnect 230, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Processors 210 are the central processing units (CPUs) of a storage system (e.g., file sever 120, shown in FIG. 1) and, thus, control the overall operation of the storage system. In certain embodiments, processors 210 accomplish this by executing software stored in memory 220. Processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage system 120. Memory 220 represents any form of random access memory (RAM), read-only memory (ROM), flash memory, or the like, or a combination of such devices. Memory 220 stores, among other things, operating system 300 of storage system 120, in which the capacity guarantee techniques introduced above can be implemented.

Also connected to processors 210 through the system interconnect 230 are one or more internal mass storage devices 250, a storage adapter (or a number of storage adaptors) 260, and a network adapter (or a number of network adaptors) 270. Internal mass storage devices 250 may be or include any conventional medium for storing large volumes of data in a non-volatile manner, such as one or more magnetic or optical based disks. The storage adapter 260 allows storage system 120 to access storage subsystem 140 (shown in FIG. 1) and may be, for example, a Fibre Channel adapter or a Small Computer System Interface (SCSI) adapter. Network adapter 270 provides storage system 120 with the ability to communicate with remote devices, such as the clients 110 (shown in FIG. 1), over a network and may be, for example, an Ethernet adapter.

Figure 3:
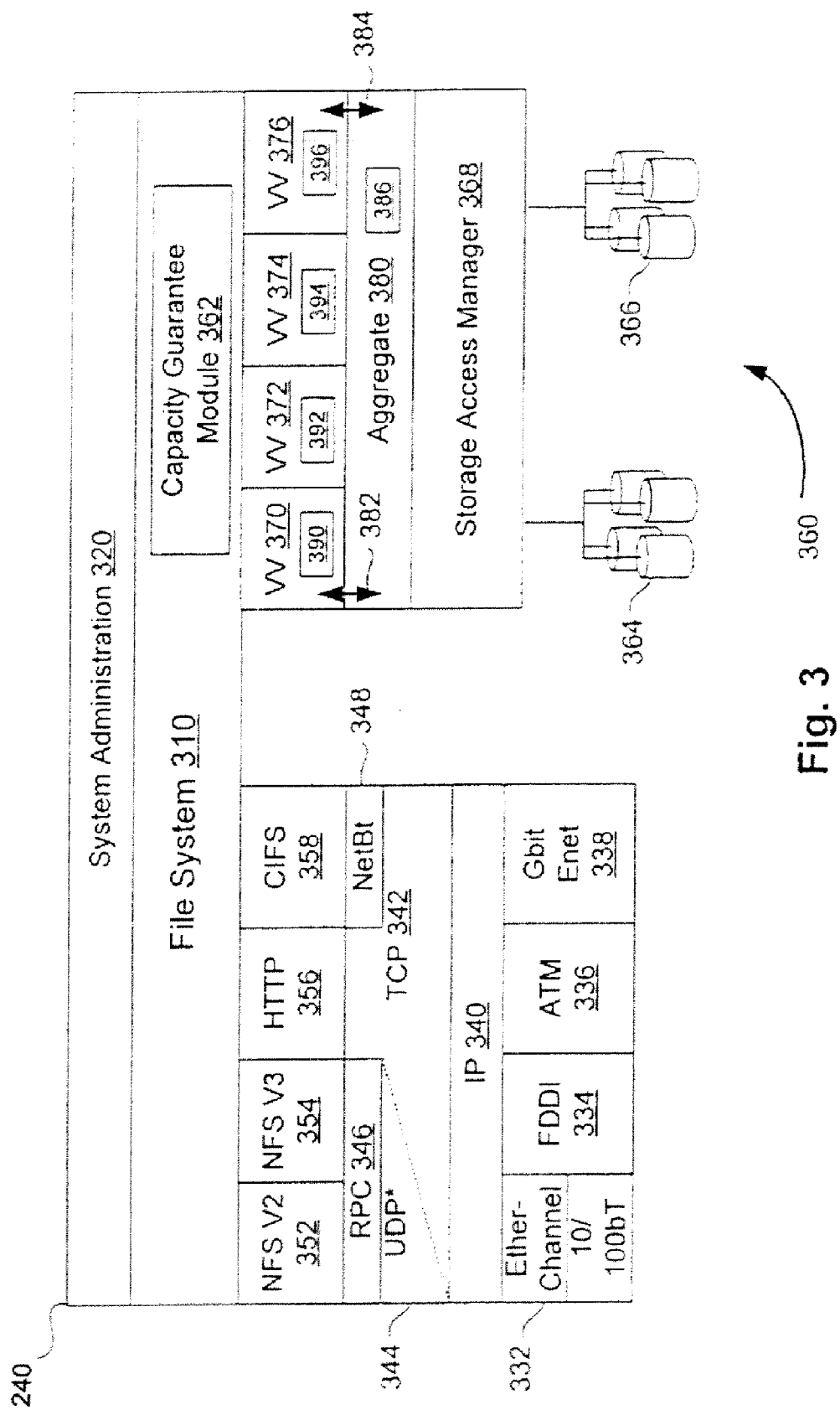
FIG. 3 is a block diagram illustrating selected aspects of the logical architecture of a storage system, according to an embodiment of the invention.

FIG. 3 is a block diagram illustrating selected aspects of the logical architecture of a storage system (e.g., its operating system), according to an embodiment of the invention. In an embodiment, operating system 300 includes a collection of coupled processing modules to handle client requests (e.g., requests from clients 110, shown in FIG. 1). A request from a client is initially received at the network drivers at the lower left, and moves up through the network protocol layers and the file system, eventually generating disk input/output (I/O) if necessary. When file system 310 finishes the request, it sends a reply back to the network. System administration layer 320 monitors and controls the modules below. In addition to the modules shown in FIG. 3, a kernel of operating system 300 may provide basic services such as process creation, memory allocation, message passing, and interrupt handling. In an alternative embodiment, operating system 300 may include more modules, fewer modules, and/or different modules.

In an embodiment, operating system 300 includes a number of network drivers to process client requests. The illustrated embodiment includes Ether-channel driver 332, Fiber Distributed Data Interface (FDDI) driver 334, Asynchronous Transfer Mode (ATM) driver 336, and gigabit Ethernet driver 338. In an alternative embodiment, operating system 300 may include more network drivers, fewer network drivers, and/or different network drivers.

Operating system 300 includes an implementation of Internet Protocols (IP) 340. In an embodiment, operating system 300 includes implementations of both Transmission Control Protocol (TCP) 342 and User Datagram Protocol (UDP) 344. In addition, the network layer may include implementations of Remote Procedure Call (RPC) 346 and NetBIOS over TCP/IP 348. Operating system 300 may also implement one or more of various higher-level network protocols, such as Network File System (NFS) 352, 354, Common Internet File System (CIFS) 358, and/or Hypertext Transfer Protocol (HTTP) 356.

File system 310 is application-layer software that manages the directory structure (e.g., the hierarchical structure) of the data stored in storage subsystem 360. For example, file system 310 manages read/write operations on the data stored in storage subsystem 360 (e.g., executes read/write operations on the disks in response to client requests). In one embodiment, file system 310 includes capacity guarantee module 362. In an alternative embodiment, capacity guarantee module 362 is implemented in a different layer (e.g., different than layer 310) of operating system 300 and/or is distributed across more than one layer (and/or more than one module) of operating system 300. As is further described below, with reference to FIGS. 5-8, capacity guarantee module 362 provides logic to determine how much storage is actually pre-allocated when virtual volumes (and/or) files are created.

In one embodiment, file system 310 provides the capability of generating a "snapshot" of the active file system. A snapshot is a read-only copy of at least a portion of file system 310. In an embodiment, file system 310 uses a copy-on-write technique to avoid duplicating data blocks that are the same in a snapshot as they are in the active file system. That is, a snapshot is initially a copy of the file layout (e.g., as defined by metadata) of file system 310. The data blocks of active file system 310 are only copied to a snapshot when they are modified or removed. The term active file system refers to the currently active file system of storage system 300.

Operating system 300 includes virtual volumes 372-376 and aggregate 380. In an embodiment, virtual volumes 372-376 are logical data containers that can be sized, resized, managed, and moved independently form the underlying physical storage. Virtual volumes 372-376 decouple what was, in conventional volumes, a direct connection between volumes and their associated physical disks. This decoupling of virtual volumes and physical disks vastly increases the flexibility and storage efficiency of operating system 300.

In contrast to conventional systems, the storage for a volume is provided by an abstraction layer (e.g., an aggregate) rather than directly from disks. For example, virtual volumes 370-376 obtain storage from aggregate 380. The storage for Aggregate 380, in turn, is provided by storage subsystem 360.

Figure 4:
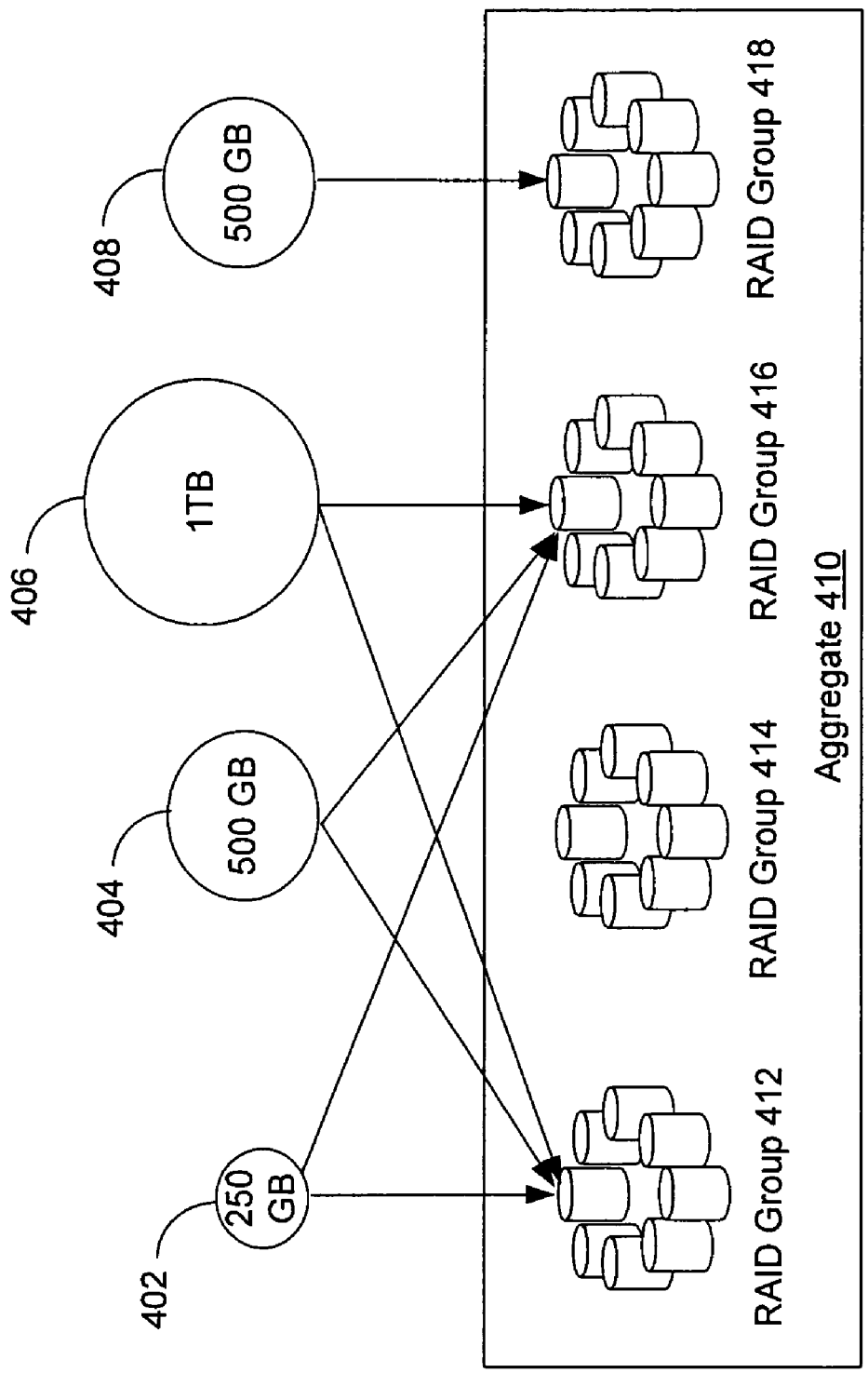
FIG. 4 is a block diagram illustrating selected relationships between a number of virtual volumes and an aggregate, according to an embodiment of the invention.

FIG. 4 is a block diagram illustrating selected relationships between virtual volumes 402-406 and aggregate 410, according to an embodiment of the invention. Aggregate 410 provides a common pool of physical storage to virtual volumes 402-406. In the illustrated embodiment, this common pool of physical storage includes RAID groups, 412-416. The common pool of physical storage is not, however, limited to RAID groups. Instead, it can include any storage technology suitable for mass storage. The arrows connecting virtual volumes 402-406 to aggregate 410 illustrate that each virtual volume may store data in any or all of RAID groups 412-416. Virtual volume 408 illustrates a virtual volume storing data on RAID group 418. The common pool of physical storage provided by aggregate 410 enables a more efficient storage architecture because unused disk space can be allocated to any virtual volume that needs it.

In an embodiment, storage space can be allocated to a virtual volume without actually reserving space on the underlying physical storage. The reason for this is that there is a layer of metadata separating a virtual volume from the underlying physical storage. This layer of metadata decouples the allocation of space in a virtual volume from the reservation of space on the physical storage. In such embodiments, "over-provisioning" of a virtual volume is possible. Over-provisioning refers to allocating more space to a virtual volume (or a set of virtual volumes) than is actually available in the physical storage. Using virtual volume 404 as an example, an additional 500 GB may be allocated to virtual volume 404 even if there are only 1.75 TBs of physical storage space available to aggregate 410.

The ability to overprovision storage space creates the possibility of having insufficient storage space in aggregate 410 to meet user demands. In some cases, it is preferable to ensure that there is sufficient space in aggregate 410 to satisfy user demands. Referring again to FIG. 3, in an embodiment, capacity guarantee module 362 provides a mechanism for ensuring that there is sufficient space in aggregate 380.

Capacity guarantee module 362 provides capacity guarantees (e.g., capacity guarantees 382 and 384). A "capacity guarantee" refers to a contract between a virtual volume and an aggregate in which the aggregate "agrees" to reserve (e.g., in the physical storage) a specified amount of space for the virtual volume. In other words, a capacity guarantee is a reservation of space in physical storage for a virtual volume.

In an embodiment, there is more than one type of capacity guarantee. Examples of possible types of capacity guarantees include but are not limited to: volume, file, none, and partial. A "volume guarantee" ensures that there is sufficient space in aggregate 380 for the entire capacity of a virtual volume. A "file guarantee" indicates that writes to a file will not fail as long as the file does not grow. If the file does grow, then its reservation guarantee may be lost. A "partial guarantee" indicates that aggregate 380 guarantees a specified fraction of the capacity of the virtual volume. The capacity guarantee type of "none" indicates that there is no space reservation for the virtual volume. The different types of capacity guarantees are further discussed below with reference to FIGS. 5-7.

In an embodiment, operating system 300 maintains one or more data structures to support capacity guarantees. In some embodiments, these data structures are counters while in alternative embodiments different and/or additional data structures may be used. In one embodiment, two levels of counters are used: the aggregate level (e.g., counter 386); and the volume level (e.g., counters 390-396). The aggregate level counter 386 maintains data for aggregate 380 and volume level counters 392-396 maintain data for virtual volumes 370-376 respectively.

In an embodiment, each volume level counter 390-396 maintains both a count of space within the aggregate that is used by the respective virtual volume (e.g., a U counter) and a count of reserved space that is reserved for the virtual volume but not yet used (e.g., an R counter). The aggregate level counter 386 maintains, for example, the sum of all of the space within the aggregate that is used by virtual volumes 370-376 and the sum of all of the space reserved in the aggregate for virtual volumes 370-376. In addition, the size of aggregate 380 and/or the sizes of virtual volumes 370-376 may be maintained by one or more data structures within operating system 300.

Counters 386-396 (and/or other comparable data structures) allow capacity guarantee module 362 to set and resize capacity guarantees for virtual volumes 370-376. In an embodiment, setting a capacity guarantee (and/or resetting a capacity guarantee) involves calculating the space required from aggregate 380 to support the guarantee and determining whether the required space is available in aggregate 380. Counters 390-396 allow, for example, capacity guarantee module 362 to calculate the space required from aggregate 380 to support the guarantee. Similarly, counter 386 allows capacity guarantee module 362 to determine whether the required space is available in aggregate 380. Setting a capacity guarantee is further described below with reference to FIG. 8.

For purposes of explanation, counters 386-396 are illustrated as being located within their associated structures. It is to appreciated, however, that counters 386-396 may be located almost anywhere within operating system 300. For example, in an embodiment, counters 386-396 are part of capacity guarantee module 362.

In an alternative embodiment, the values discussed above with reference to counters 386-396 may be stored in persistent storage and accessed as needed. In such an embodiment, capacity guarantees are available both when a file system (e.g., file system 310) is online and when it is offline.

In an embodiment, the reserved space can be anywhere within the physical storage (e.g., anywhere in RAID groups 364 and 366). In such an embodiment, storage access manager 368 determines where within the physical storage data is written. Storage access manager 368 implements a higher-level disk storage protocol, such as RAID, while the storage driver layer (not shown) implements a lower-level storage device access protocol, such as Fibre Channel Protocol (FCP) or SCSI.

Figure 5:
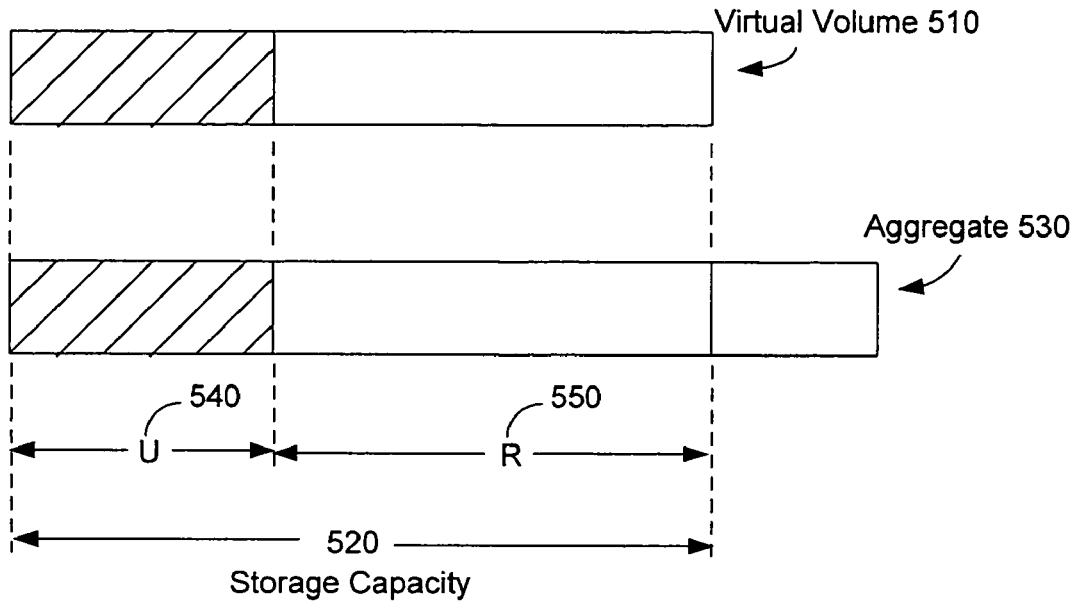
FIG. 5 is a block diagram illustrating a volume guarantee according to an embodiment of the invention.

FIG. 5 is a block diagram illustrating a volume guarantee according to an embodiment of the invention. Virtual volume 510 has a volume guarantee 520 on aggregate 530. As shown in FIG. 5, volume guarantee 520 is guaranteeing the entire capacity of virtual volume 510 on aggregate 530. Counter 540 represents the amount of used space in virtual volume 510. Similarly, counter 550 represents the amount of space reserved for volume guarantee 520 to which data has not yet been written. In an embodiment, counters 540 and 550 may be used to determine how much space is required from aggregate 530 for volume guarantee 520. Counters 540 and 550 may also be used to determine whether aggregate 530 has sufficient space available to provide volume guarantee 520. That is, the U and R and counters (e.g., counters 540 and 550) can be used to calculate the free space in the aggregate that is required to establish the guarantee and/or to determine whether sufficient space is available on aggregate 520.

Figure 6:
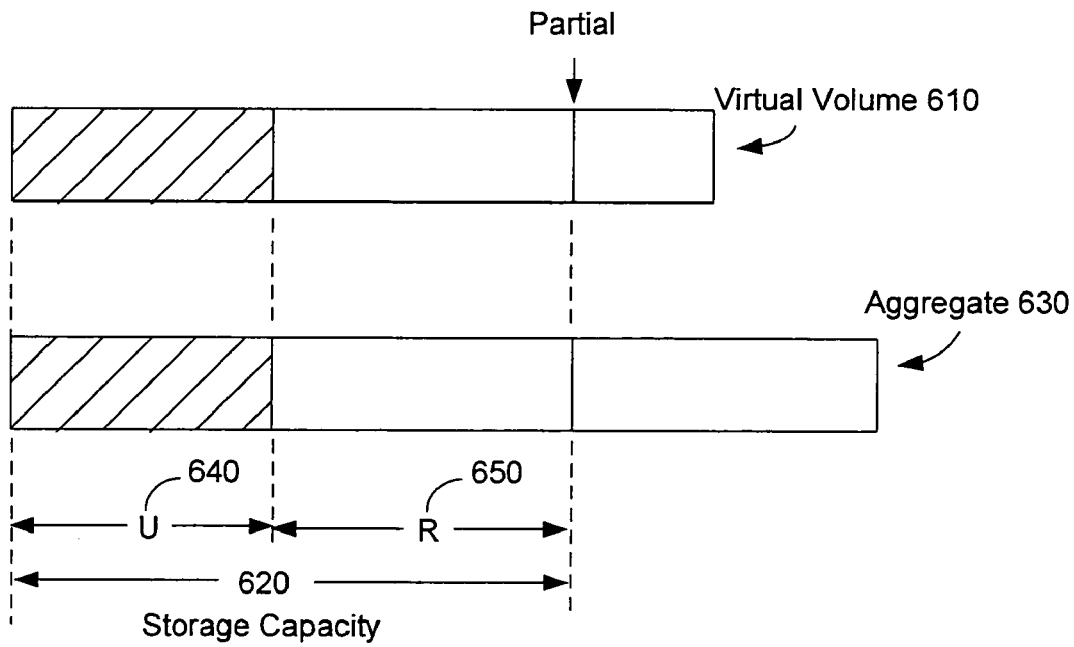
FIG. 6 is a block diagram illustrating a partial guarantee, according to an embodiment of the invention.

FIG. 6 is a block diagram illustrating a partial guarantee according to an embodiment of the invention. Virtual volume 610 has a partial guarantee 620 on aggregate 630. As shown in FIG. 6, partial guarantee 620 is only guaranteeing a specified fraction of the capacity of virtual volume 610 on aggregate 630. Counter 640 represents the amount of used space in virtual volume 610. Similarly, counter 650 represents the amount of space reserved for partial guarantee 620 to which data has not yet been written. In an embodiment, counters 640 and 650 may be used to determine how much space is required from aggregate 630 for partial guarantee 620. Counters 640 and 650 may also be used to determine whether aggregate 630 has sufficient space available to provide partial guarantee 620. That is, the U and R and counters (e.g., counters 640 and 650) can be used to calculate the free space in the aggregate that is required to establish the guarantee and/or to determine whether sufficient space is available on aggregate 620.

Figure 7:
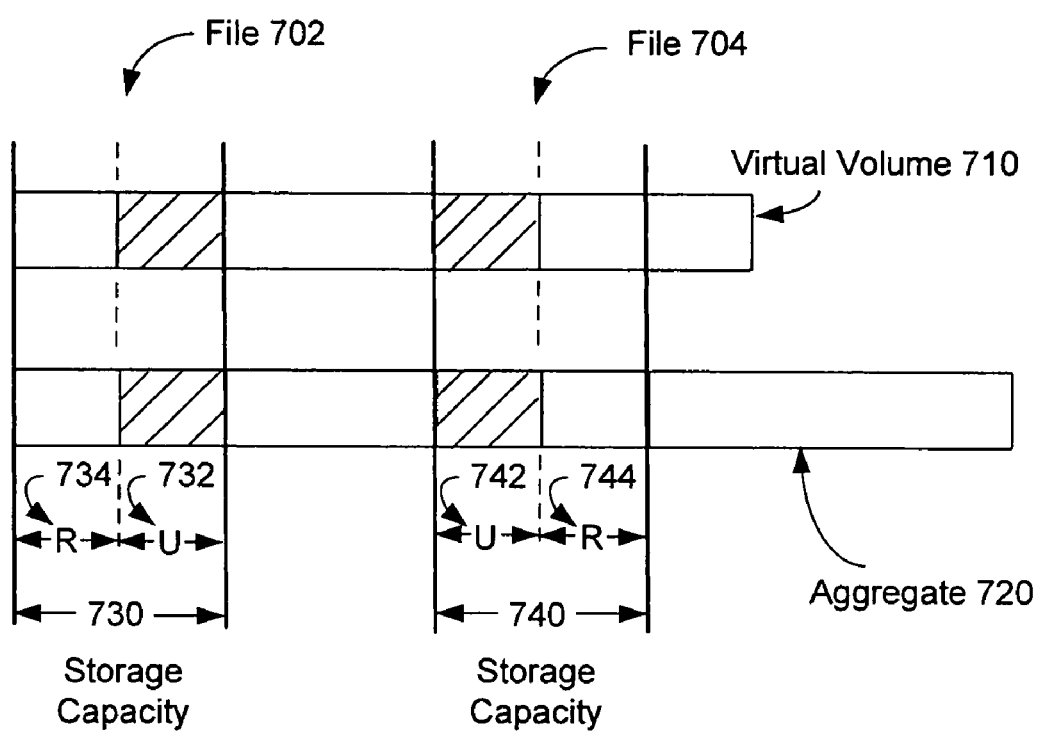
FIG. 7 is a block diagram illustrating a file guarantee, according to an embodiment of the invention.

FIG. 7 is a block diagram illustrating a file guarantee according to an embodiment of the invention. As described above, a file guarantee indicates that specified files can be filled to a reserved size. Files 702-704 represent files on virtual volume 710 for which file guarantees are set on aggregate 720. In an embodiment, the operating system (e.g., operating system 300, shown in FIG. 3) may provide an interface through which files are selected for file guarantees and specific sizes are reserved for the files.

As shown in FIG. 7, file 702 has file guarantee 730 on aggregate 720. Similarly, file 704 has file guarantee 740 on aggregate 720. Each of file guarantees 730 and 740 have a counter for used space (e.g., counters 732, 742) and a counter for reserved space that is not yet used (e.g., counters 734, 744). In an embodiment, these counters may be used to calculate the free space in the aggregate that is required to establish the guarantee and/or to determine whether sufficient space is available on aggregate 720.

As described above with reference to FIG. 3, in an embodiment, the file system provides the capability of generating a "snapshot" of the active file system. In such an embodiment, a snapshot may affect the amount of space reserved for a file guarantee (e.g., file guarantee 740). The reason for this is that, when snapshots are supported, capacity guarantee semantics may reserve space (in a virtual volume and/or an aggregate) so that data associated with the snapshot can be written in accordance with a copy-on-write policy.

Consider, for example, an example in which the amount of space that is used by file 702 is represented by X. A snapshot of file 702 would initially require virtually no space (except, for example, the space for the snapshot metadata). As file 702 is modified, however, the amount of space used by the snapshot approaches X. In theory, the amount of reserved space needed to ensure writes to file 702 and its snapshot approaches 2X (plus a small amount of space for metadata). In an embodiment, the capacity guarantee semantics take into account space that might be needed by one or more snapshots. For example, file guarantee 730 may include a "buffer" of reserved space to support one or more snapshots. In such an embodiment, any of a wide range of polices may be used to determine how much "extra" space to reserve for a snapshot. This extra space may, for example, have a ceiling approximately equal to the amount of space used by file 702 when the snapshot was generated.

The amount of space reserved in the aggregate (e.g., aggregate 720) for snapshots may, in certain cases, be more productively used by the active file system. For example, if the rate of change of data associated with a snapshot is relatively slow, then much of the space reserved for snapshots may remain unused. In an embodiment, the file system may provide a snapshot auto-delete function. The snapshot auto-delete function enables policy-based auto-deletion of snapshots to free up space in the aggregate. The policy used to direct the auto-delete function may, for example, automatically delete snapshots when they exceed a certain threshold (e.g., 5% of the aggregate). It is to be appreciated that the policy may take into account any of a number of factors when determining whether to delete snapshots.

Figure 8:
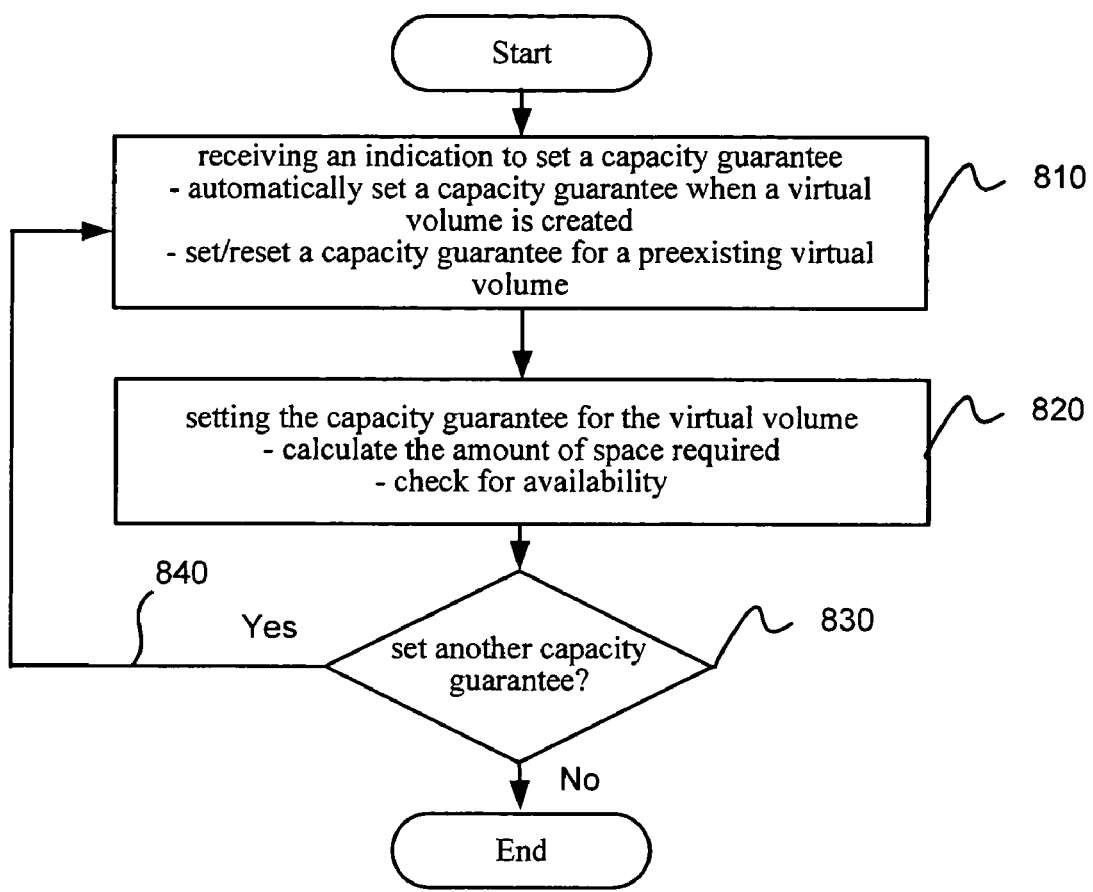
FIG. 8 is a flow diagram illustrating certain aspects of a method for capacity guarantees, according to an embodiment of the invention.

Turning now to FIG. 8, the particular methods associated with embodiments of the invention are described in terms of computer software and hardware with reference to a flowchart. The methods to be performed by a computing device (e.g., a storage system) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for capacity guarantees, according to an embodiment of the invention. Referring to process block 810 a system (e.g., operating system 300, shown in FIG. 3) receives an indication to set a capacity guarantee for a virtual volume. The received indication may be from, for example, a user interface (either remote or local to a filer), an administrative console, and/or a process executing on the filer (e.g., a process to create a virtual volume). In an embodiment, an aggregate (e.g., aggregate 386, shown in FIG. 3) provides an abstraction layer between the virtual volume and the underlying physical storage (e.g., RAID groups 364-366, shown in FIG. 3). The term "abstraction layer" refers to providing a logical abstraction of the underlying physical storage to decouple what has conventionally been a direct relationship between volumes and physical storage.

The phrase "receiving an indication" refers to receiving an instruction/command/notice/message/signal/etc. that indicates a capacity guarantee is requested. In an embodiment, a capacity guarantee is automatically set for a virtual volume, when the virtual volume is created. In such an embedment, "receiving an indication" may refer to receiving an indication that the virtual volume has been created. The phrase "receiving an indication" may also refer to receiving an indication to set and/or reset a capacity guarantee for a preexisting virtual volume. For example, a capacity guarantee module (e.g., capacity guarantee module 362, shown in FIG. 3) may receive an instruction/command/notice/message/signal/etc. from a user interface indicating that a capacity guarantee has been set and/or reset for one or more of virtual volumes 370-376. The user interface may be either local or remote (e.g., on an administrative console) to the filer on which capacity guarantee module 362 is running.

In an embodiment, the capacity guarantee has an associated type. Examples of guarantee types include: volume, file, partial, and none. For ease of reference a capacity guarantee may be referred to according its associated type. For example, a capacity guarantee of type volume may be referred to as a volume guarantee.

Referring to process block 820, the capacity guarantee is set for the virtual volume. In an embodiment, setting the capacity guarantee involves calculating the amount of space in the associated aggregate that is required by the guarantee and determining whether the required space is available in the aggregate. Storage space is typically allocated and/or reserved in blocks. In one embodiment, the blocks of memory are 4 KB in size. In another embodiment, the size of blocks may be larger, smaller, and/or may vary from block to block.

In an embodiment, each virtual volume maintains one or more data structures (e.g., counters 390-396) to store values corresponding to how much space within the virtual volume has been used and how much space is reserved but not used. Similarly, in an embodiment, the aggregate maintains one or more data structures to show the sum of all space used within the aggregate and the sum of all space reserved within the aggregate that is not yet used. In one embodiment, these data structures are used to set a capacity guarantee. It is to be appreciated, however, that embodiments of the invention do not require that the aggregate maintain its counters as sums.

In an embodiment, the capacity guarantee module calculates the amount of free space required based, at least in part, on the data structures associated with the virtual volume for which the capacity guarantee is being set. Referring to FIG. 5 as an example, the sum of counters 540 and 550 show how much space is required by volume guarantee 520. In the case of a file guarantee (e.g., file guarantees 730 and 740, shown in FIG. 7) the calculation may based on the sum of the separate U and R counters for each file. The U and R counters are shown in bold here to distinguish them from similar U and R counters that belong to an aggregate.

Whether the counter R belongs to the aggregate or to another entity (e.g., a virtual volume or a file), it is of special significance for actually enforcing a guarantee. Since the U counter indicates how many blocks are already used, the aggregate does not need to reserve these blocks. As blocks get allocated in the volume/file, U grows and R shrinks. As blocks are freed, U shrinks and R grows. Thus, in an embodiment, U+R is always constant until the reservation itself is changed.

The capacity guarantee module may determine whether the required space is available based, at least in part, on the data structures associated with the aggregate. In one embodiment, the aggregate maintains a value R indicating the total (e.g., summed across all associated virtual volumes) amount of space that is reserved in the aggregate but not yet used. In addition, the aggregate maintains a value U indicating the total (e.g., summed across all associated virtual volumes) amount of space within the aggregate that is used and a value S indicating the total amount of space available in the aggregate (e.g., determined by the underlying physical storage). In such an embodiment, the amount of free space F within the aggregate may be determined by the expression: $F=S-(U+R)$. In an alternative embodiment, the determination of whether there is sufficient free space in the aggregate may be based on different values having different relationships.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable media suitable for storing electronic instructions. Further, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An apparatus comprising: a file system to maintain a structure of data stored in an array of physical storage devices and to service read and write requests from one or more clients relating to data stored in the array of physical storage devices; a plurality of virtual volumes sharing a logical aggregation of physical storage from the array of storage devices, wherein each virtual volume is a logical data container; an abstraction layer between the one or more virtual volumes and the array of physical storage devices providing the logical aggregation of physical storage, so that each said virtual volume has only an indirect relationship to the physical storage devices, wherein the abstraction layer enables unused storage space from the logical aggregation of physical storage to be allocated to any virtual volume of the plurality of virtual volumes on an as-needed basis, and wherein storage space from the logical aggregation of physical storage can be allocated to any virtual volume of the plurality of virtual volumes without requiring reservation of the allocated storage space on the set of physical storage; and a processor to implement a capacity guarantee module, to provide a first capacity guarantee for a first virtual volume of the plurality of virtual volumes and to provide a second capacity guarantee for an individual file within one of the plurality of virtual volumes independently of providing the first capacity guarantee, and further to provide a partial volume guarantee for a second virtual volume of the plurality of virtual volumes to provide sufficient space for the second virtual volume to be filled to a specified fraction of its capacity, wherein the specified fraction is less than the entire second virtual volume.

2. The apparatus of claim 1, wherein the capacity guarantee module comprises:
   a first counter to indicate the number of unused blocks in the specified virtual volume that are reserved for the capacity guarantee; and
   a second counter to indicate a number of used blocks in the virtual volume.

3. The apparatus of claim 2, wherein the capacity guarantee module further comprises:
   a third counter to indicate the total number of unused blocks in the logical aggregation of physical storage that are reserved for all capacity guarantees supported by the logical aggregation of physical storage; and
   a fourth counter to indicate a number of used blocks in the logical aggregation of physical storage.

4. The apparatus of claim 3, wherein the capacity guarantee module further comprises:
   logic to determine whether there is space available in the logical aggregation of physical storage based, at least in part, on the third counter and fourth counter.

5. The apparatus of claim 4, wherein the capacity guarantee module is an element of the file system.

6. A machine-readable storage medium storing instructions which, when executed by a machine, cause the machine to perform a set of operations comprising: setting a first capacity guarantee for a first virtual volume of the plurality of virtual volumes to guarantee that a logical aggregation of physical storage will provide a specified amount of storage space to the first virtual volume, the logical aggregation of physical storage being provided by an abstraction layer between the virtual volume and a physical storage facility, the abstraction layer providing a logical aggregation of physical storage to a plurality of virtual volumes including said virtual volume, such that the virtual volumes obtain storage only indirectly from the physical storage, wherein the abstraction layer enables unused storage space from the Logical aggregation of physical storage to be allocated to any virtual volume of the plurality of virtual volumes on an as-needed basis, and wherein storage space from the logical aggregation of physical storage can be allocated to any virtual volume of the plurality of virtual volumes without requiring reservation of the allocated storage space on the set of physical storage; and setting a second capacity guarantee for-a-an individual file within a virtual volume one of the plurality of virtual volumes, independently of setting the first capacity guarantee, to guarantee that the logical aggregation of physical storage will provide a specified amount of storage space to the individual file; and setting a partial capacity guarantee for a second virtual volume of the plurality of virtual volumes, the partial capacity guarantee expressed in terms of a fraction of the storage space of the second virtual volume, wherein the specified fraction is less than the entire second virtual volume and is not, to guarantee that the logical aggregation of physical storage will provide sufficient space for the second virtual volume to be filled to said fraction of its capacity.

7. A machine-readable storage medium as recited in claim 6, wherein setting a capacity guarantee for the virtual volume comprises:
   setting a capacity guarantee for a previously created virtual volume.

8. A machine-readable storage medium as recited in claim 6, wherein setting the capacity guarantee for the virtual volume comprises:
   determining a guarantee type for the virtual volume;
   calculating a number of free blocks within the logical aggregation of physical storage to be used by the capacity guarantee based on the guarantee type; and
   determining whether the number of free blocks within the logical aggregation of physical storage to be used by the capacity guarantee are available.

9. A machine-readable storage medium as recited in claim 8, wherein determining whether the number of free blocks within the aggregate to be used by the capacity guarantee are available comprises:
   determining a value R representing a number of unused blocks in the logical aggregation of physical storage that are reserved for a capacity guarantee;
   determining a value U representing a number of used blocks on the logical aggregation of physical storage;
   determining a value S indicating a total number of blocks in the logical aggregation of physical storage; and
   calculating the number of free blocks F wherein F is a function of R, U, and S.

10. A machine-readable storage medium as recited in claim 9, wherein calculating F comprises calculating F=S−(U+R).

11. A machine-readable storage medium as recited in claim 6, wherein the logical aggregation of physical storage is a logical aggregation of one or more Redundant Array of Inexpensive Disks (RAID) groups.

12. A storage server comprising: a processor; a first communication interface through which to communicate with a mass storage facility; a second communication interface through which to communicate with a set of storage clients over a network; and a memory storing instructions which, when executed by the processor, cause the storage server to perform operations including: maintaining a plurality of virtual volumes, each of the virtual volumes being a logical data container that is physically implemented by one or more physical storage devices in the mass storage facility, maintaining an abstraction layer between the virtual volumes and the physical storage devices in the mass storage facility, the abstraction layer providing a logical aggregation of physical storage in the mass storage facility, wherein two or more of said virtual volumes share storage in the mass storage facility, and wherein at least one of the virtual volumes can be over-provisioned so that storage space allocated to each over-provisioned virtual volume is allowed to exceed an amount of available physical storage space, wherein the abstraction layer causes the virtual volumes to obtain storage only indirectly from the physical storage, wherein the abstraction layer enables unused storage space from the logical aggregation of physical storage to be allocated to any virtual volume of the plurality of virtual volumes on an as-needed basis, and wherein storage space from the logical aggregation of physical storage can be allocated to any virtual volume of the plurality of virtual volumes without requiring reservation of the allocated storage space on the set of physical storage; setting a capacity guarantee for a first virtual volume of the plurality of the first virtual volumes in response to a first user input, to require that the logical aggregation of physical storage provide a specified amount of storage space to the first virtual volume when one or more of the plurality of virtual volumes is over-provisioned, and setting a capacity guarantee for an individual file within one of the plurality of virtual volumes in response to a second user input, to require that the logical aggregation of physical storage provide a specified amount of storage space to the individual file and setting a partial capacity guarantee for a second virtual volume of the plurality of virtual volumes in response to a third user input, to require that the logical aggregation of physical storage provide an amount of storage space for the second virtual volume equal to a specified fraction of the capacity of the second virtual volume, wherein the specified fraction is less than the entire second virtual volume.

13. A method comprising: maintaining, by a network storage server, a plurality of virtual volumes and a set of physical storage; maintaining, by the network storage server, an abstraction layer between the plurality of virtual volumes and the physical storage, so that each of the plurality of virtual volumes has only an indirect relationship to the physical storage, the abstraction layer providing a logical aggregation of physical storage to the plurality of virtual volumes, wherein the abstraction layer enables unused storage space from the logical aggregation of physical storage to be allocated to any virtual volume of the plurality of virtual volumes on an as-needed basis, and wherein storage space from the logical aggregation of physical storage can be allocated to any virtual volume of the plurality of virtual volumes without requiring reservation of the allocated storage space on the set of physical storage; and enabling, by the network storage server, a capacity guarantee to be set at each of a plurality of different levels for one or more virtual volumes of the plurality of virtual volumes, the plurality of different levels, including a volume level, a file level and a partial volume level, wherein a capacity guarantee set at the volume level requires the logical aggregation of physical storage to provide a specified amount of storage space to a virtual volume, a capacity guarantee set at the file level requires the logical aggregation of physical storage to provide a specified amount of storage space to-a-an individual file within a virtual volume, and a capacity guarantee set at the partial volume level requires the logical aggregation of physical storage to provide sufficient space for a virtual volume to be filled to a specified fraction of its capacity, wherein the specified fraction is less than the entire second virtual volume.

* * * * *